Jan. 13, 1942.   T. W. HALLERBERG ET AL   2,269,663
AIR CLEANER
Filed April 29, 1940   4 Sheets-Sheet 1

Inventors
THEODORE W. HALLERBERG.
FRANK SEBOK.

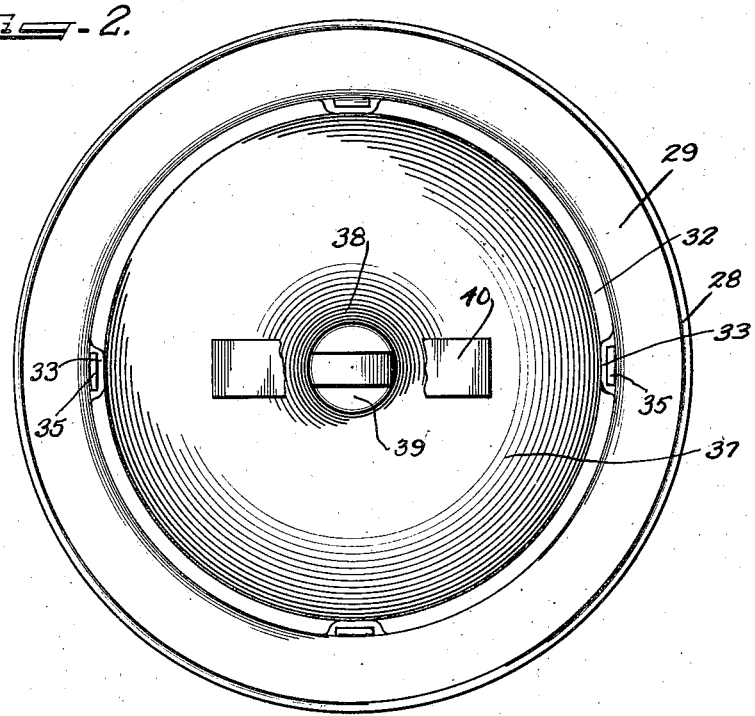
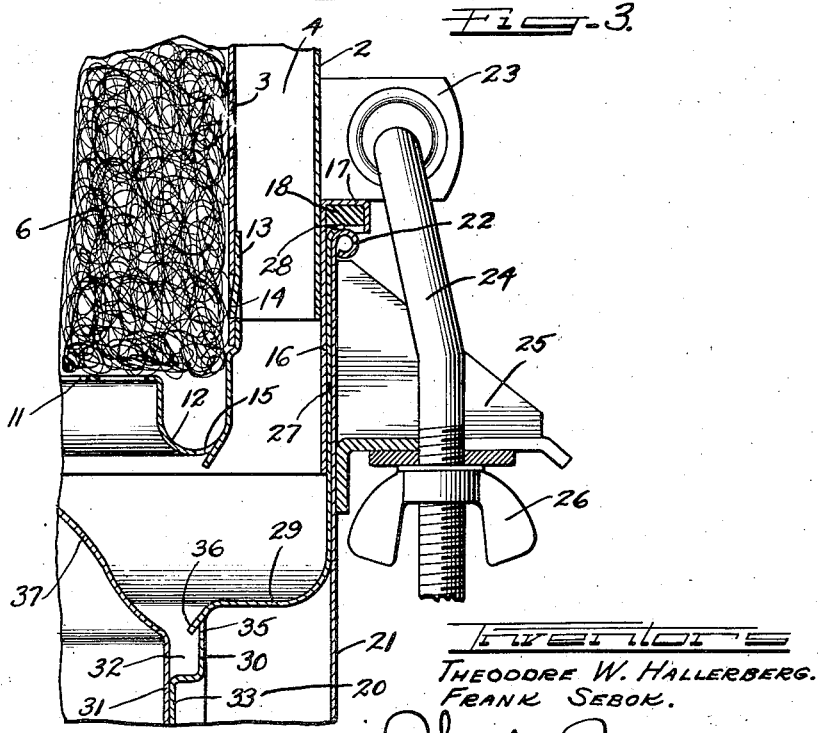

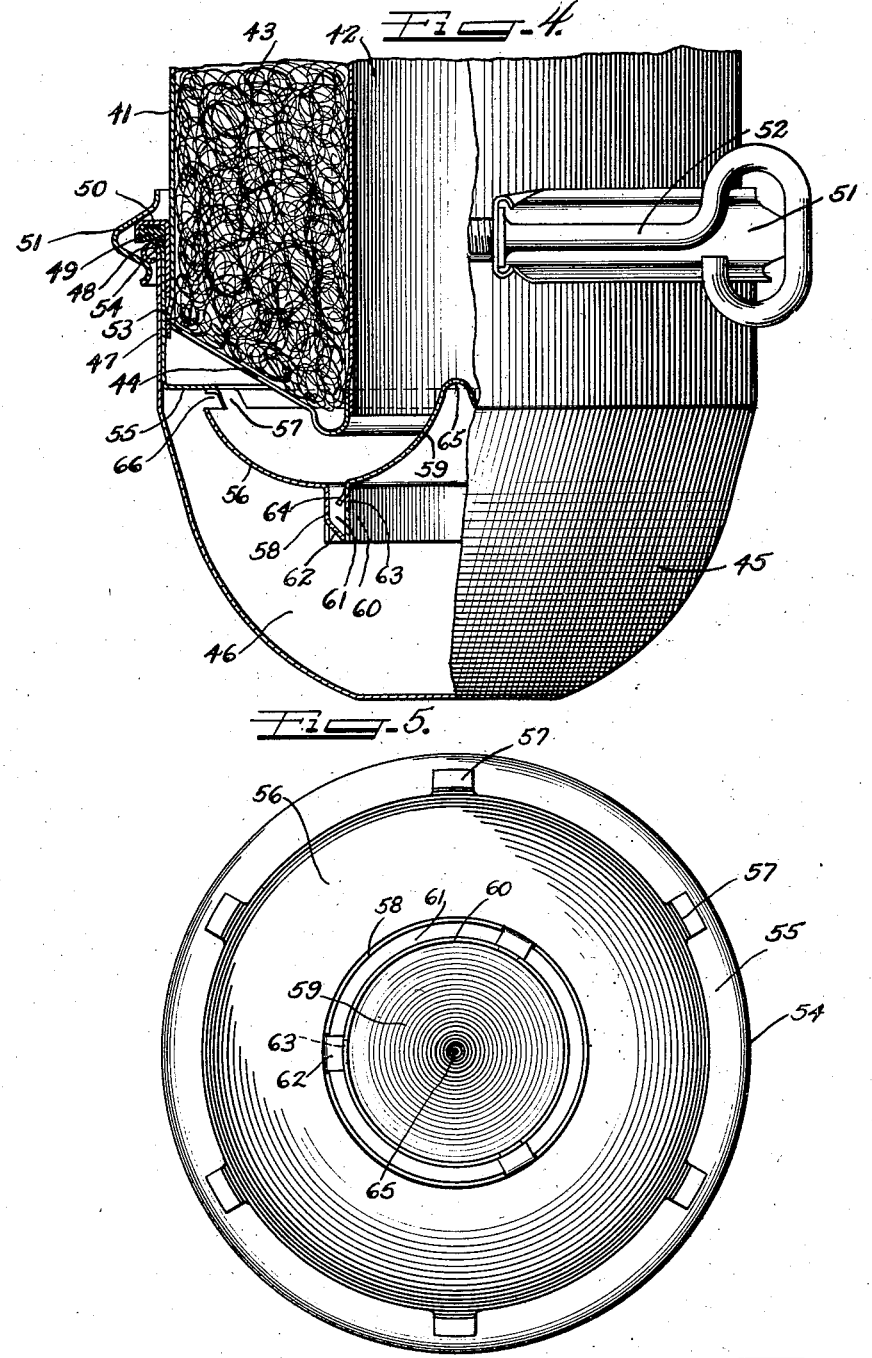

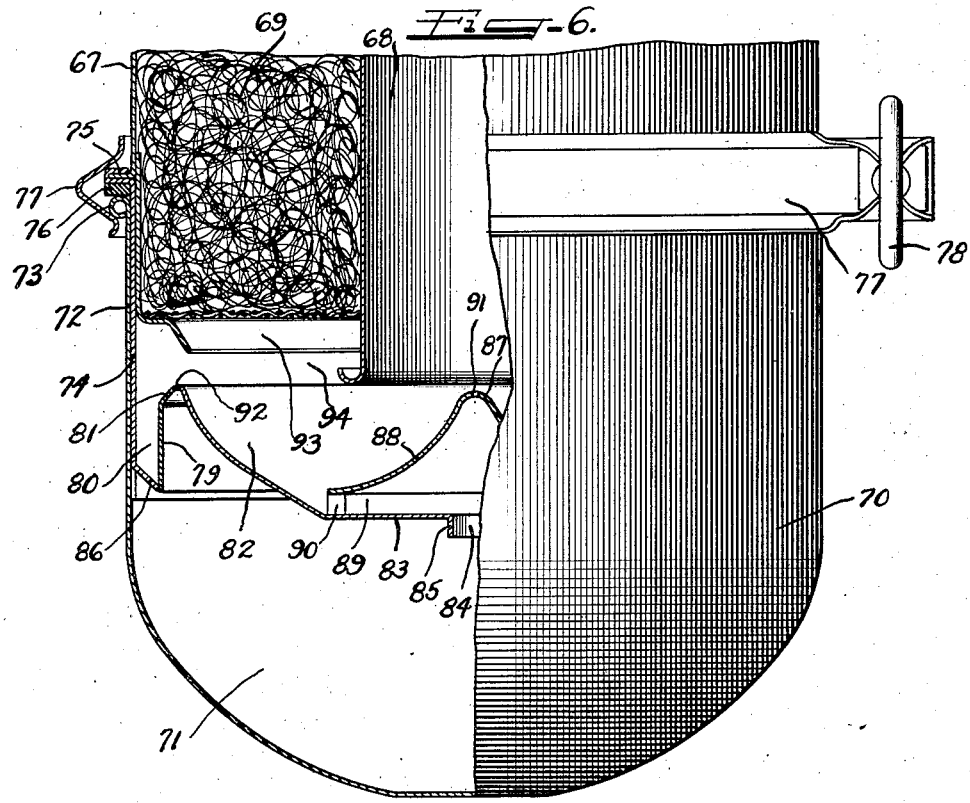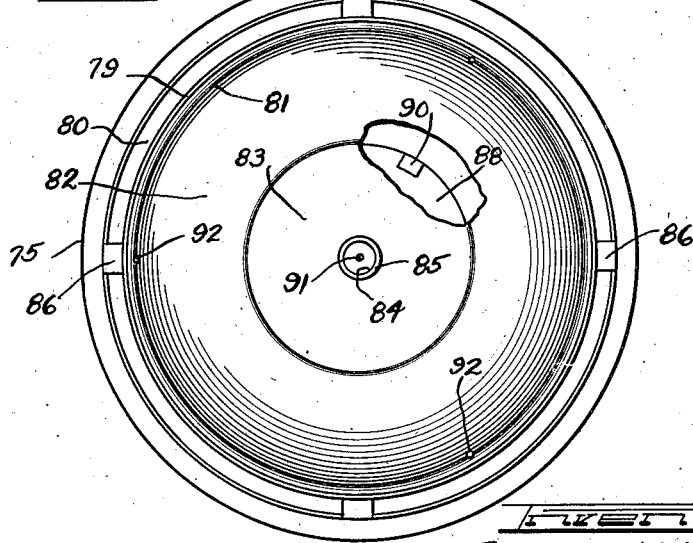

Patented Jan. 13, 1942

2,269,663

UNITED STATES PATENT OFFICE 2,269,663

AIR CLEANER

Theodore W. Hallerberg and Frank Sebok, Chicago, Ill., assignors to United Specialties Company, Detroit, Mich., a corporation of Delaware Application April 29, 1940, Serial No. 332,130

8 Claims. (Cl. 183—15)

This invention relates to improvements in air cleaners, and more particularly to improvements in air cleaners of the liquid bath type highly desirable for use in connection with the internal combustion engines for trucks, tractors, and similar automotive vehicles, although the invention will have other uses and purposes as will be apparent to one skilled in the art.

In air cleaners of the liquid bath type, there is frequently provided a casing shaped to define a liquid sump in the bottom portion thereof, with filter means disposed in the upper part of the casing above the sump, and a baffle construction disposed substantially transversely of the sump below the filter means. Air entering the cleaner is contacted and washed by sump liquid, at which point most of the heavier impurities are removed from the air, and then entrained sump liquids and the finer impurities carried by the air are both removed as the air passes through the filter mass before it exits from the cleaner. Sometimes the baffle construction was held in the cleaner by virtue of the outer annular margin of the baffle being pressed against a horizontal shoulder by a spring ring or the equivalent. This construction caused the baffle sometimes to wear to a very fine sharp edge, and in addition was objectionably expensive.

In addition, with cleaners of this character heretofore known, difficulty was experienced in pullover of cleansing liquid into the carburetor or the vehicle engine as a result of splashing of cleansing liquid due to up and down jolts of the vehicle, and swishing or similar agitation of the cleansing liquid due to side sway of the vehicle. In such constructions, there is usually an opening establishing communication between opposite sides of the baffle, and frequently incoming air aspirates or educes sump liquid through this opening into the air stream. Splashing and other agitation of the liquid would sometimes spill an undue quantity of liquid through such opening to the filter side of the baffle where this additional liquid would also be carried along by the air stream. Accordingly, it occasionally happens that sufficient added cleansing liquid was thus supplied to the air stream to wet the filter mass to a greater than desired extent and some of the liquid was carried over by outgoing air into the carburetor or engine.

With the foregoing in mind, the present invention relates more specifically to the provision of novel baffle constructions for use in a liquid bath air cleaner, which baffle construction is designed to preclude the unintentional displacement of cleansing liquid to the air stream side of the baffle in any quantity above a clearly negligible amount.

Another object of the invention is the provision of a novel baffle construction for liquid bath air cleansers in which the baffle is simply, effectively, and economically held in proper position within the cleaner casing and is not subject to undue wear by virtue of its mounting arrangement.

Another feature of the invention resides in the provision of a novel baffle construction which may be placed in a filled sump of a liquid bath air cleaner without entrapment or pocketing of air within relatively high portions of the baffle or within such locations that the pocketed air might interfere with the desired functioning of the cleaner and circulation of sump liquid.

It is another object of the invention to provide a baffle construction for liquid bath air cleaners, wherein communication between opposite sides of the baffle is established by a pair of spaced walls of sufficient length and arrangement as to preclude any but a negligible amount of sump liquids passing to the opposite side of the baffle by virtue of jolting, bumping, or side sway of the vehicle carrying the air cleaner.

Still another feature of the invention resides in the provision of a baffle construction as just above mentioned, wherein certain cross connections are provided between the spaced walls defining the passage between opposite sides of the baffle, and provision is made to automatically maintain these cross connections clean and free from accumulated dirt removed from air passing through the cleaner.

Still a further object of this invention is the provision of a novel baffle construction for liquid bath air cleaners, which baffle construction is economical, highly durable, and arranged to augment the over all efficiency of the air cleaner with which it is associated.

Another feature of the invention resides in the provision of a new and novel method of varying the circulation of the sump liquid, the likelihood of pullover of sump liquid into a carburetor or engine, the capacity of the air cleaner, or any of them.

While some of the more salient features, characteristics and advantages of the present invention have been above pointed out, others will become apparent from the following disclosures, taken in conjunction with the accompanying drawings, in which:

Figure 2 is a top plan view of the baffle construction of Figure 1, showing the same removed from the cleaner;

Figure 3 is an enlargement of the lower right-hand portion of Figure 1 to better illustrate details of construction;

Figure 4 is a fragmentary part sectional part elevational view of a liquid bath air cleaner of different construction, containing a baffle construction also embodying principles of the present invention;

Figure 5 is a bottom plan view of the baffle construction of Figure 4, showing the same removed from the air cleaner;

Figure 6 is a fragmentary part sectional part elevational view of a liquid bath air cleaner of the type shown in Figure 4, containing a different form of baffle construction embodying principles of the present invention; and Figure 7 is a bottom plan view, with a part broken away, of the baffle construction of Figure 6, showing the same removed from the cleaner;

As shown on the drawings:

Figure 1:
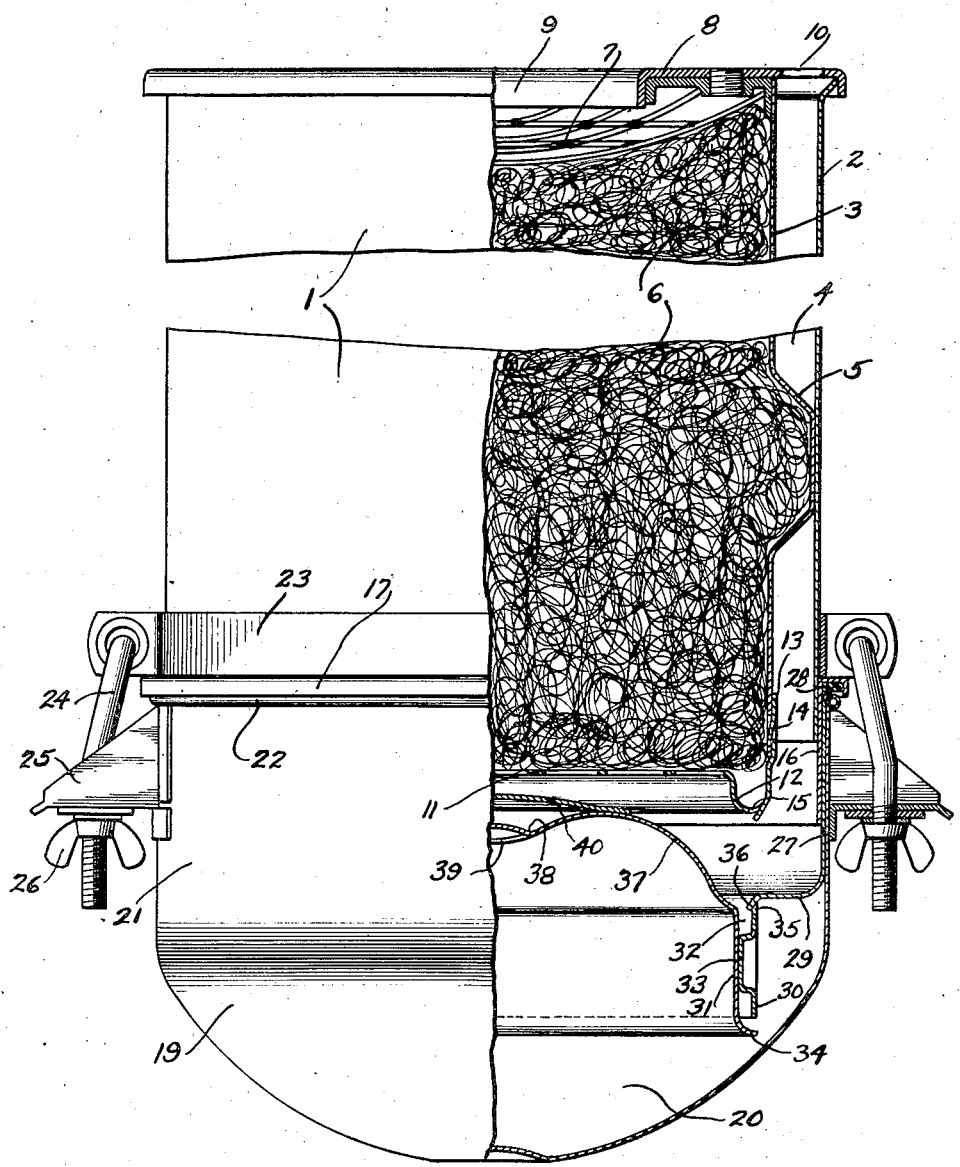
Figure 1 is a fragmentary part sectional part elevational view of an air cleaner containing a baffle construction embodying principles of the present invention.

For the purpose of clarity, baffle constructions embodying principles of the present invention have been illustrated both with a liquid bath air cleaner having an annular air inlet adjacent the outer wall of the casing with the central upper portion of the casing occupied by a filter mass, and with a liquid bath air cleaner having a center tube extending well within the cleaner to function as an air inlet, and the upper portion of the casing around the tube being occupied by a filter mass, it being appreciated that baffle constructions may be arranged for use in either of these types of cleaners without departing from the principles and spirit of the invention.

The first illustrated embodiment of this invention is shown in conjunction with a liquid bath air cleaner including a casing comprising a pair of separable sections, an upper section 1 and a lower section. The upper section is defined by a pair of spaced walls, an outer wall 2 and an inner wall 3 concentric therewith, the two walls defining an annular air inlet passage 4 therebetween. At spaced intervals the inner wall 3 is bulged into contact with the outer wall 2 as indicated at 5 for adequate support and rigidity. Inside the wall 3 a filter mass 6 is disposed, this mass being copper gimp, curled cattle tail hair, or any other suitable filter medium. Above the filter mass 6, the usual hardware cloth supporting screen 7 is disposed just beneath a cover 8 having an outlet opening 9 to which conduit means leading to the intake of the carburetor may be connected, and one or more marginal intake openings 10 communicating with the inlet passage 4.

At the lower end of the wall 3 a filter supporting element is disposed which includes a central open screen portion 11, a channel formation 12 thereon, an upstanding wall 13 embracing the inner wall 3, and a series of tongues 14 struck from the wall 13 and engaged in suitable apertures in the wall 3 to hold the filter support in position. The channel part 12 has drainage openings 15 in the bottom thereof through which sump liquids from the filter mass may drain back directly into the air stream thus establishing a positive circulation through the lower portion of the filter mass 6, as more fully set forth and claimed in Theodore W. Hallerberg pending application entitled: "Air cleaner" filed April 1, 1939, Serial No. 265,396.

At the lower portion of the outer wall 2 a circumscribing band or sleeve 16 is provided and secured to the wall 2 by spot welding or in an equivalent manner. At the upper end thereof, the sleeve 16 is turned outwardly into channel form as indicated at 17 to function as a holder for a sealing gasket 18.

The lower casing section 19 is in the general form of a cup having a rounded bottom portion defining an inside liquid sump 20, and an upper straight wall 21 for telescopic association with the upper structure of the cleaner and which terminates at its top in an annular bead 22 for association with the sealing gasket 18. The casing sections may be removably attached together in any suitable manner, the illustrated mechanism, which is by way of example, showing a ring 23 around the upper section resting upon the channel 17 engaged by an eye bolt 24 extending through a lug or the equivalent 25 attached to the lower casing section 19, and the lowermost end of the eye bolt being secured by a wing nut 26 or the equivalent. One such structure is preferably disposed on each side of the cleaner as seen in Figure 1.

The novel baffle construction incorporated in the cleaner above described is in the nature of a unitary construction as seen in Figure 2, which was fabricated from several initially separate pieces. However, the entire baffle construction may be handled as one individual piece when placing it in the air cleaner or removing it therefrom.

The baffle construction includes an outer substantially straight wall 27 for telescopic association with the aforesaid sleeve 16 on the upper casing section. This wall 27 is flared outwardly at the top thereof as indicated at 28 for intimate association with the bead 22 on the lower casing section 19 as clearly seen in Figure 3. In short, when the parts are assembled the sleeve 16, the wall 27 of the baffle construction, and the wall portion 21 of the lower casing section are all in telescopic relationship and the flare 28 on the wall 27 of the baffle construction will be compressed between the gasket 18 and the bead 22. In this manner the entire baffle construction is rigidly supported in position within the cleaner, and may be very simply and easily removed as a single piece of mechanism from the cleaner upon releasing the thumb nuts 26—26 and dropping the lower casing section.

The outer annular part of the baffle construction is shaped to provide a substantially horizontal shelf 29 which merges into a substantially straight cylindrical wall 30 extending down into the liquid sump 20. The inner portion of the baffle construction includes a similar substantially vertical wall 31 in spaced relationship to the wall 30 to define a passage 32 therebetween through which sump liquid may be aspirated or educed by incoming air traveling over the upper surface of the baffle construction. The two walls 30 and 31 are joined together at intervals to make the baffle construction unitary and support the inside portion thereof, as indicated at 33 by pressing humps out of one of the walls, in this instance the wall 30, and spot welding or equivalently securing the pressed out portion to the other wall.

It will be noted that the lower marginal portion of the wall 31 is turned outwardly as indicated at 34 to underlie the passage or opening 32, this part of the wall 31 extending below the wall 30 so as to leave an annular entrance to the opening or passage 32 through which entrance sump liquid must pass in a substantially lateral direction and then rise through the opening 32. It will be appreciated that by virtue of the length of the walls 30 and 31 and the angular direction the sump liquid must take to pass through the opening 32 that it will be almost impossible for liquid to rise through this opening by virtue of agitation caused by jolting or side sway of the vehicle carrying the air cleaner. In other words, swishing caused by side sway will not cause the sump liquid to follow the angular course thru the opening 32, and vertical splashing caused by jolting or bumping of the vehicle will not throw sump liquid through the opening 32 by virtue of the turn margin 34 on the inner wall. Consequently, if any liquid does accidentally rise through the opening 32 to the opposite side of the baffle construction, that amount will be clearly a negligible amount and need not be considered. On the other hand, incoming air passing downwardly through the inlet passage 4, over the shelf 29, and upwardly through the interior of the cleaner will aspirate an adequate amount of sump liquid through the opening 32 for the proper operation of the air cleaner.

Immediately above each of the humps 33, which of course form transverse shoulders across the opening 32, the outer wall 30 is provided with an elongated aperture 35 formed by pressing out a tongue 36 from the metal of the wall, the tongue 36 being left inclined at an angle so as to eliminate aspiration of sump liquid through the opening 35 by air traveling through the cleaner. These openings 35 not only serve to prevent a pocketing of air beneath the shelf 29 in the event the baffle construction is inserted in a filled liquid sump, but also tend to prevent dirt removed from air passing through the cleaner from accumulating on each of the shoulders formed by the humps 33, because at the start of the operation, some sump liquid will pass through the apertures 35 and wash over the shoulders of the humps 33.

The inner portion of the baffle construction is shaped in the nature of a general arcuate dome 37 above the wall 31, in keeping with the intended course of travel of air through the cleaner. The central portion of the dome 37 is indented as indicated at 38 and in the central portion of the indentation or recess an opening 39 is provided to prevent pocketing of air beneath the central part of the baffle construction in the event the sump is full of cleansing liquid when the baffle construction is inserted in place. Over the central portion of the baffle construction a suitable handle 40 is preferably provided merely as an aid in removing and replacing the baffle construction.

In operation, the construction above described is extremely simple and very highly efficient. At the outset, the sump is filled with cleansing liquid to a static level substantially even with the top of the handle 40, so that the inlet passage 4 will initially be sealed off with cleansing liquid. When the internal combustion engine with which the air cleaner is associated is started, the initial suction of air through the cleaner will immediately lift out that portion of sump liquid occupying the lower part of the incoming channel 4, the space above the shelf 9 and that portion between the dome part 37 and the channel 12 on the filter support, and this liquid will be carried up into the filter mass 6, thus immediately saturating the lower portion of the filter mass to a desired extent so that efficient operation is present from the start. Thereafter, liquid will drain through the openings 15 from the channel of the filter support directly into the air stream, and other necessary liquid will be aspirated through the opening 32 from the sump, there being some liquid of course returning to the sump by gravity through the opening 39 at the center of the baffle construction. Thus, the baffle construction provides an adequate circulation of sump liquid, and the formation incorporated in this baffle construction and above described effectively prevents any but a very negligible amount of sump liquid from reaching the air stream side of the baffle construction by virtue of agitation of the liquid due to jolting, side sway, etc., of the vehicle carrying the cleaner. It will be further appreciated that the baffle construction is positively held in proper position by virtue of the flare 28 being compressed between the gasket 18 and the bead 22 on the lower casing section 19 so that the baffle construction will not be disposed to rattle or wear materially in any part. The ease and facility with which the baffle construction may be removed and replaced is also apparent from the novel mounting.

In Figures 4 and 5 a center tube inlet type of air cleaner is illustrated including a baffle construction embodying principles of the present invention. In this instance, the air cleaner includes a casing made up of separable sections including an upper casing section 41 having a center tube 42 extending well within the casing to function as an air inlet. Between the wall 41 and the tube 42 a mass of filtering material 43 is disposed, this filtering material circumscribing the inlet 42 in concentric relation therewith. A suitable filter supporting element 44, channeled adjacent the inlet in the manner above described, is also associated with the lower end of the casing section and the inlet tube, as more fully set forth and described in my aforesaid copending application. The cleaner also includes a lower casing section 45 the lower portion of which is shaped to define a liquid sump 46 therein, and the upper portion of which rises in a substantially straight wall 47 terminating in an outturned bead 48. When the lower casing section is in telescopic association with the upper casing section, the bead is associated with a sealing gasket 49 carried in a suitable gasket holder 50 attached to the upper casing section. The two casing sections are held joined together by means of a V-shaped annular split ring 51 the ends of which are outturned and may be contracted with a suitable bolt and nut arrangement generally indicated at 52 in a manner known to the art. As the split ring 51 is tightened by the bolt and nut arrangement 52, the inclined walls of the split ring press inwardly on the gasket holder 50 and the bead 48 thus pushing these parts axially towards each other to positively unite the casing sections.

The novel baffle construction associated with this type of cleaner includes an outer substantially cylindrical portion 53 for telescopic association with the gasket holding element 50 and the upper portion 47 of the lower casing section, which wall portion 53 is outwardly flared as at 54 at its upper margin to be held between the bead 48 and the gasket 50 in the manner above described in connection with Figures 1 to 3 inclusive. This arrangement supports the entire baffle construction in position within the cleaner.

The lower part of the wall portion 53 is turned inwardly substantially at right angles to provide a substantially horizontal shelf or shoulder 55 which is in the nature of an annular ring extending around the inside of the lower cleaner section and as will later appear, functions as a scoop to remove dirt and heavy dirt-laden oil particles from traveling air.

Secured to the under side of the ring part 55 is a concave member 56, curved in keeping with the intended travel of the air stream through the cleaner, which is attached to the part 55 by spaced lugs 57 spot welded or otherwise secured to the ring 55. At the inner part thereof, the concave member 56 terminates in a substantially vertical wall 58 extending downwardly into the liquid sump. The center portion of the baffle construction includes a peaked member extending into the tubular inlet 42, and having a wall portion 59 curving away from its apex in keeping with the concave curvature of the part 56, so that the part 56 and the wall portion 59 in effect form a continuous curve of proper formation to guide the air through the cleaner. The curving wall 59 also terminates in substantially a vertical wall portion 60 spaced from the aforesaid vertical wall 58 to define therebetween an opening 61 establishing communication between opposite sides of the baffle construction. At periodic intervals, a tongue 62 is struck from the wall portion 58 and the end portion of each of these tongues is soldered, spot welded, or otherwise secured to the wall portion 60 to properly unite the respective parts of the baffle construction.

The tongues 62 provide a sloping shoulder inside the opening 61, and in order to maintain this shoulder free from accumulated dirt, an aperture or opening 63 is provided in the wall 60 above each of the tongues 62, the aperture being defined by a tongue 64 struck out from the wall 60 and left in inclined position inside the opening 61. These apertures 63, as well as an aperture 65 in the center of the peak portion in the baffle also effectively prevent the entrapment of air in the event the baffle construction is inserted into the sump when full of cleansing liquid.

An important feature of this baffle construction resides in the space 66 between the arcuate member 56 and the annular ring member 55. This space or gap is important in that a variation in its width will effect the circulation of the cleansing liquid, the likelihood of pull-over of cleansing liquid from the air cleaner, and the capacity of the air cleaner, or all of them. For example, if this gap 66 is increased, then there is a greater circulation of sump liquid over the concave member 56, there is consequently less likelihood of pull-over of the cleansing liquid from the air cleaner because the additional liquid passing over the member 56 will not be carried up into the filter mass but will be scooped out of the air stream by the annular ring member 55. Also, increasing the size of the gap 66 will result in a greater capacity, that is, a greater number of cubic feet of air per minute, of the cleaner as a whole.

It will therefore be appreciated that there is provided a novel method of controlling the fundamental characteristics of the air cleaner. This method is by way of varying the width of the gap 66. For example, if it is desired to increase the circulation of sump liquid and lessen the likelihood of pull-over into the carburetor or engine, the gap 66 may be widened and the cleaner operated on the same capacity as before. On the other hand, if it is desired to increase the operating capacity of the cleaner, the gap may be widened, more air sent through the cleaner, and the circulation and liklihood of pull-over will remain the same as before.

In operation, the structure of Figures 4 and 5 is also simple and highly efficient. Incoming air descends through the tube 42, strikes the curved wall portion 59 of the high central part of the baffle construction, follows the curvature of this wall portion over the opening 61, upwardly over the concave member 56 into the filter mass. The initial or static liquid level of the cleansing liquid is substantially even with the top of the peak portion of the baffle construction or even with the aperture 65, thus sealing off the inlet. As the entering air comes in, all of that liquid above the concave member 56 and the curved wall portion 59 is immediately pushed upwardly into the filter mass to saturate the lower portion of the mass. Thereafter, sump liquid will be aspirated or educed by traveling air upwardly through the opening 61 and a material amount of the heavier dirt carried by the air will be removed by contact with this liquid on or immediately above the concave member 56. That portion of the sump liquid which becomes heavy by acquisition of dirt from the air, will be advanced upwardly over the member 56 and be scooped from the air stream by the ring member 55, passing through the gap 66 and returning to the sump beneath the concave member 56. There will also be a circulation of cleansing liquid within the filter mass itself. As stated above, the first described circulation of cleansing liquid, namely that over the concave member 56, may be increased or decreased by varying the width of the gap 66.

It will further be appreciated that due to the height of the wall portions 58 and 60 defining the opening 61, only a negligible amount of sump liquid could ever pass to the opposite side of the baffle by virtue of up and down splashing of sump liquid. It will be substantially impossible for any sump liquid to rise through the opening 61 by virtue of agitation resulting from side sway of the vehicle carrying the cleaner. The baffle construction shown in Figures 4 and 5 operates with substantially the same degree of efficiency and prevention of undesired transference of liquid from the sump side of the baffle to the air stream side, as does the construction shown in Figures 1, 2 and 3 for the annular inlet type of cleaner.

Another form of baffle construction is shown in Figures 6 and 7, also in connection with a center tube inlet air cleaner. In this instance, the air cleaner includes an upper casing section 67 through which a center tube 68 extends to function as an inlet for the cleaner, and between the casing 67 and the tube 68 a filter mass 69 is disposed. The cleaner also includes a lower section 70 shaped to define a liquid sump 71 therein, and having a vertical wall portion 72 terminating in an outturned bead 73.

In this instance, the baffle construction is permanently disposed in position, and the vertical wall 72 of the lower casing section telescopes over a cylindrical portion 74 of the baffle construction, the upper end of which portion 74 is lock-seamed around an outstanding flange on the casing section 67, as indicated at 75. An annular sealing gasket 76 is pushed over the wall portion 74 against the lock seam 75, where it remains in position by its own inherent resiliency. A V- shaped clamping ring 77, the ends of which are outturned to accommodate a suitable bolt and nut connection 78 (as above described in connection with Figures 4 and 5) may be used to hold the upper and lower casing sections united against the gasket 76.

The novel baffle construction includes an intermediate portion defined by a vertical wall 79 spaced from the aforesaid wall portion 74 to provide an opening or a passage 80 establishing communication between opposite sides of the baffle construction. The wall portion 79 is humped as indicated at 81 and then curves downwardly as at 82 in a concave curvature in keeping with the desired passage of air through the cleaner. The curvature 82 merges into a substantially horizontally disposed portion 83 in the center of which is an aperture 84 defined by a vertically extending wall 85, of sufficient length to preclude any but a negligible amount of sump liquid being carried therethrough by virtue of agitation of the vehicle carrying the air cleaner. The intermediate portion of the baffle construction is held in position by a plurality of tongues 86 struck from the outer wall portion 74 and spot-welded, soldered or equivalently secured to the intermediate part.

The central portion of the baffle construction includes a peaked member 87 having a downwardly curving wall portion 88 which is curved complementally or in keeping with the desired course of travel of the air so as to serve as an adequate guide. The curved wall part 88 terminates above the horizontal part 83 of the intermediate portion leaving an opening 89 between these parts, and sump liquid may be aspirated or educed through the opening 84 and the opening 89 into the air stream. This central portion of the baffle construction is held in place by a plurality of lugs 90 which may be spot-welded or equivalently attached to the intermediate portion adjacent the horizontal part 83.

In order that the baffle construction may be inserted in a filled liquid sump without undesired entrapment of air beneath the high portions of the baffle construction, an aperture 91 is provided in the peak part 87, and one or more apertures 92 are preferably provided in the hump portion 81. These apertures, together with the opening 80, the aperture 84, and the space 89 are sufficient to prevent entrapment or pocketing of air.

Above the baffle construction is an annular downwardly inclined scoop member 93 attached to the wall portion 74 of the baffle construction. This scoop member terminates above the hump 81 so as to leave a gap 94 through which heavy dirt-laden sump liquid may return to the sump through the annular opening or passage 80.

In operation, incoming air descends through the tube 68, strikes the curved wall portion 88 of the peak member and is guided thereby towards the concave wall portion 82 which in turn directs the air upwardly into the filter mass 69. The initial or static liquid level is preferably even with the top of the peak part 87, and that sump liquid initially occupying the space above the concave portion 82 and the curved part 88 will be immediately carried into the filter mass to saturate the lower portion thereof. As the air follows its guided path through the cleaner, it will aspirate or educe sump liquid through the opening 84 and the space 89, upwardly over the curved part 82 into the air stream. Most of this educed liquid will immediately become heavy due to removal of dirt from the traveling air, and thus tend to hug the surface of the baffle construction to be scooped out of the air stream by the annular member 93, and then will return through the opening 80 into the sump. It will be noted that agitation of the sump liquid caused by jolting or side sway of the vehicle carrying the cleaner will not be sufficient to ever carry any but a very negligible amount of sump liquid to the air stream side of the baffle construction, owing to the distance between the opening 84 and the space 89, and owing to the height of the opening or passage 80. It will further be clearly appreciated that the circulation of sump liquid over the baffle construction, the likelihood of pull-over from the air cleaner, and the capacity of the cleaner may be controlled by varying the gap 94, as above described in connection with the showing in Figures 4 and 5. In this instance, it would be a simple expedient to install a longer or shorter scoop element 93 to vary the gap 94 and thus alter the fundamental characteristics of the cleaner as may best be desired.

From the foregoing, it is apparent that we have provided novel baffle constructions for association with liquid bath air cleaners, as well as novel means for supporting the baffle constructions in proper position within the cleaners. It will be noted that our baffle construction effectively eliminates previous difficulties of pull-over of cleansing liquid into the carburetor by virtue of this cleansing liquid reaching the air stream side of the baffle construction due to jolting, side sway, or other agitation of the cleansing liquid by movement of the vehicle carrying the cleaner. It will be noted that the novel baffle constructions herein set forth, are economical to produce, simple, durable, and highly efficient in use. It will further be noted that we have provided a novel method of varying the capacity of the cleaner, or of controlling other fundamental characteristics of the cleaner such as likelihood of pull-over from the air cleaner, and circulation of cleansing liquid.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In an air cleaner of the liquid bath type, a casing shaped to provide a liquid sump therein, filter means in said casing above said sump, and a baffle disposed transversely of said sump below said filter means and shaped to provide an eduction opening in the form of an annulus defined by spaced walls which are embodied in the baffle itself and supported wholly thereby and which are both spaced inwardly from the casing and of sufficient length and shape to preclude any but a negligible amount of liquid passing through said opening as a result of splashing or agitation caused by side sway, and means preventing the upward passage of liquid outside of said eduction opening.

2. In an air cleaner of the liquid bath type, a casing shaped to provide a liquid sump therein, filter means in said casing above said sump, and a baffle disposed transversely of said sump below said filter means and shaped to provide therein an eduction opening in the form of an annulus supported wholly by said baffle and defined by spaced walls both spaced inwardly from the casing and of sufficient length and shape to preclude any but a negligible amount of liquid passing through said opening as a result of splashing or agitation caused by side sway, and means to prevent the upward passage of liquid outside of said eduction opening, there being cross connections between said walls at spaced intervals and one of said walls having vent openings therein above said cross connections.

3. In an air cleaner of the liquid bath type having an air inlet and an air outlet, a casing shaped to provide a liquid sump therein, a baffle construction disposed substantially transversely of said sump and shaped generally in keeping with the travel of air through the cleaner so as to aid in guiding the air toward the outlet, and said baffle construction comprising elements arranged to provide an eduction opening, spaced inwardly from the casing, through which sump liquid may be educed by air traveling over the baffle construction, and said baffle construction having other and smaller openings therein disposed adjacent the upper end of said eduction opening and outside the main air path and located to prevent pocketing of air beneath the baffle if the baffle is placed in the sump after cleansing liquid has been placed in the sump and means closing the space between the outermost of said eduction opening forming elements and said casing.

4. In an air cleaner of the liquid bath type, a casing shaped to define a liquid sump in the lower part thereof, filter means in the upper part of the casing, and a baffle construction disposed substantially transversely of the sump and provided with an opening establishing communication between opposite sides of the baffle construction, said opening being defined by a pair of spaced relatively long straight walls, both spaced inwardly from said casing and embodied in the baffle construction and wholly supported thereby and arranged to preclude any but a negligible amount of liquid passing from said sump to the opposite side of said baffle construction as a result of external agitation of the cleaner as a whole and means closing the space between the outermost of said walls and said casing.

5. In an air cleaner of the liquid bath type, a casing having a liquid sump therein, a baffle construction disposed substantially transversely of said sump, said baffle construction having an opening therethrough defined by a pair of adjacent but spaced walls, cross connections between said walls at spaced intervals, and one of said walls having an opening therein above each cross connection through which sump liquid may flow over the cross connection and maintain it free of dirt moved from air traveling through the cleaner.

6. In a liquid bath air cleaner, a casing having a liquid sump therein, a fabricated baffle construction for disposition in the casing transversely of said sump, said baffle construction having a shape in keeping with the desired path of travel of air passing through the cleaner, and said baffle construction having an opening establishing communication between opposite sides thereof defined by a pair of spaced vertical walls extending into said sump, one of said walls being longer than the other and having a margin turned to underlie said opening.

7. In a liquid bath air cleaner, a casing having a liquid sump therein, a fabricated baffle construction for disposition in the casing transversely of said sump, said baffle construction having a shape in keeping with the desired path of travel of air passing through the cleaner, and said baffle construction having an opening establishing communication between opposite sides thereof defined by a pair of spaced vertical walls extending into said sump, one of said walls being longer than the other and having a margin turned to underlie said opening, said opening being in the nature of an annulus surrounding the central part of said baffle construction, said central part being of an upwardly domed shape with a central depression having an aperture therein.

8. In an air cleaner of the liquid bath type, a casing having a liquid sump therein, and a baffle construction in said casing adjacent said sump, said baffle construction including an outer annular scoop member, a concave member spaced below the scoop member and extending therebeneath, another concave peaked member inwardly of the first concave member, each of said concave members terminating in a vertical wall portion, said wall portions confronting each other in spaced relationship to define an opening in the nature of an annulus establishing communication between opposite sides of said baffle construction.

THEODORE W. HALLERBERG.
FRANK SEBOK.